United States Patent Office 3,833,620
Patented Sept. 3, 1974

3,833,620
PRODUCTION OF CHENODEOXYCHOLIC ACID
William H. Saltzman, New Rochelle, N.Y., assignor to Intellectual Property Development Corporation, New Rochelle, N.Y.
No Drawing. Filed Nov. 16, 1972, Ser. No. 307,060
Int. Cl. C07c 169/48
U.S. Cl. 260—397.1
3 Claims

ABSTRACT OF THE DISCLOSURE

This invention relates to novel methods of synthesizing $3\alpha,7\alpha$-dihydroxy-$5\beta$-cholanic acid and novel intermediates therefor.

---

This invention relates to and has for its object the synthesis of $3\alpha,7\alpha$-dihydroxy-$5\beta$-cholanic acid and to novel intermediates therefor. The final compounds of this invention are known and have been found to possess useful biological properties.

A novel method has been discovered for the production of $3\alpha,7\alpha$-dihydroxy-$5\beta$-cholanic acid which entails a number of steps beginning with $3\alpha,7\alpha,12\alpha$-trihydroxy-$5\beta$-cholanic acid or analogs thereof as starting material. More particularly, this invention involves the method of producing $3\alpha,7\alpha$-dehydroxy-$5\beta$-cholanic acid directly from $3\alpha,7\alpha,12\alpha$-trihydroxy-$5\beta$-cholanic acid or analogs thereof and is more clearly illustrated by the following chemical equations wherein R, Z, Y and X are as defined in the respective formulae below:

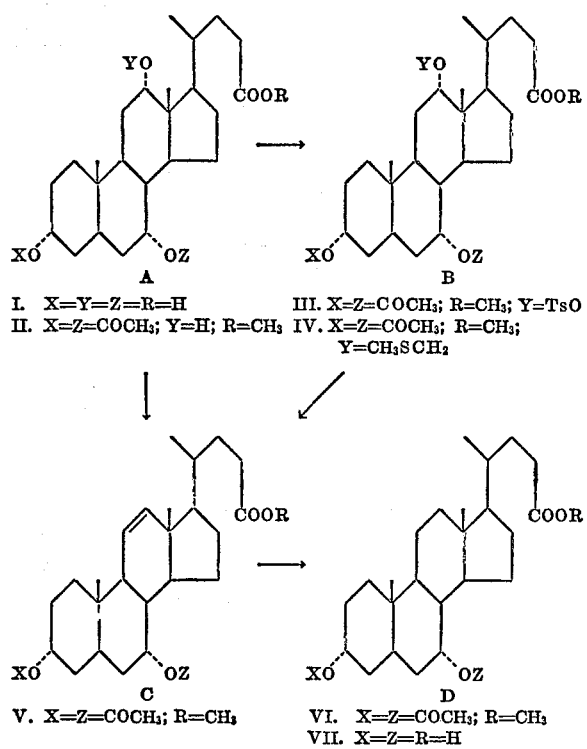

I. X=Y=Z=R=H
II. X=Z=COCH₃; Y=H; R=CH₃
III. X=Z=COCH₃; R=CH₃; Y=TsO
IV. X=Z=COCH₃; R=CH₃; Y=CH₃SCH₂

V. X=Z=COCH₃; R=CH₃
VI. X=Z=COCH₃; R=CH₃
VII. X=Z=R=H

In the first step of the process of this invention, the compounds of formula A may be treated to obtain the compounds of formula B. More particularly, the compounds of formula A, wherein X and Z are acyl, for example, acetyl and R is alkyl, for example, methyl and Y is hydrogen, may be reacted with sulfonated reagent, for example, toluene sulfonyl chloride or dimethyl sulfoxide, in the presence of a base for example, pyridine, or acyl anhydride, for example acetic anhydride, respectively, to yield the respective 12α-sulfonated esters, compounds B, which are new compounds of this invention. Compounds B are then desulfohydrated as by treatment with a suitable desulfohydration agent, for example potassium t.-butoxide combined with dimethyl sulfoxide to yield the 11-ene compounds, compounds C.

Alternatively, it has been found that it is possible to obtain the 11-ene compounds (Compounds C), directly from the 3,7,12-triol compounds (Compounds A) by treating Compounds A with a strong dehydration agent. The dehydration agents which have been found to be suitable in the practice of this invention include such dehydration agents as, methane sulfonyl chloride, thionyl chloride or methyl chlorosulfite in the presence of an organic base, for example, pyridine. By this method, it has been possible to obtain the 11-ene compounds (Compounds C) directly from the triol compounds (compounds A).

The final $3\alpha,7\alpha$-diol compounds (Compounds D), are then obtained by the catalytic hydrogenation of the 11-ene compounds (Compounds C), for example, hydrogenation in acetic acid in the presence of a palladium over charcoal catalyst.

The preferred acyl or acyloxy radicals of this invention are those of hydrocarbon carboxylic acids of twelve carbon atoms or less and include such acids as the lower alkanoic acids, the lower alkenoic acids, the cycloalkenoic acids, the aryl carboxylic acids, and other like hydrocarbon carboxylic acids.

The preferred alkyl radicals of this invention are those of six or less carbon atoms and may be characterized by the term, "lower alkyl." Thus, as employed herein, lower alkyl is meant to include such moieties as methyl, ethyl, propyl, t.-butyl, pentyl and the like.

The invention may be further illustrated by the following examples.

EXAMPLE 1

Methyl $3\alpha,7\alpha$-diacetoxy-$5\beta$-chol-11-en-$3\alpha,7\alpha$-diol-24-oic acid Methyl $3\alpha,7\alpha$-diacetoxy-$5\beta$-cholan-$3\alpha,7\alpha,12\alpha$-triol-24-oic acid, prepared in accordance with the procedure set forth by Feiser, et al. in Vol. 72, J. Amer. Chem. Soc., page 5530 (1950), in pyridine is treated with p-toluenesulfonyl chloride and held at room temperature overnight. To the reaction mixture is added ice water and the resultant product is extracted with methanol, washed and dried to yield the 12α -tosyloxy analog of methyl $3\alpha,7\alpha$-diacetoxy-$5\beta$-cholan-$3\alpha,7\alpha,12\alpha$-triol-24-oic acid.

The 12α-tosyloxy product is then treated with potassium-t-butoxide in dimethylsulfoxide at an elevated temperature, and the resultant product cooled in an ice bath, and extracted with methanol to yield methyl $3\alpha,7\alpha$-diacetoxy-$5\beta$-chol-11-en-$3\alpha,7\alpha$-diol-24-oic acid.

EXAMPLE 2

Methyl $3\alpha,7\alpha$-diacetoxy-$5\beta$-chol-11-en-$3\alpha,7\alpha$-diol-24-oic acid Methyl $3\alpha,7\alpha$-diacetoxy-$5\beta$-cholan-$3\alpha,7\alpha,12\alpha$-triol-24-oic acid is treated with dimethyl sulfoxide and acetic anhydride at room temperature for 18 hours. To the mixture is then added ice water and the resultant product extracted with methanol to yield the 12α-dimethylsulfonyl analog of methyl $3\alpha,7\alpha$ - diacetoxy-$5\beta$-cholan-$3\alpha,7\alpha,12\alpha$-triol-24-oic acid.

The 12α-dimethyl sulfonyl analog is then treated with a combination of potassium-t-butoxide in dimethyl-sulfoxide at elevated temperature, and after cooling there is obtained methyl $3\alpha,7\alpha$-diacetoxy-$5\beta$-chol-11-en-$3\alpha,7\alpha$-diol-24-oic acid.

EXAMPLE 3

Methyl 3α,7α-diacetoxy-5β-chol-11-en-3α,7α-diol-24-oic acid

To a solution of methyl-3α,7α-diacetoxy-5β-cholan-3α,7α,12α-triol-24-oic acid in dimethylformamide is added pyridine and methanesulfonyl chloride and the mixture held overnight at room temperature. Water is added and the reaction mixture extracted with ethyl acetate. The ethyl acetate layer is washed with water, dried with magnesium sulfate and evaporated. Recrystallization of the crude product from ethyl acetate-hexane yields methyl 3α,7α-diacetoxy-5β-chol-11-en-3α,7α-diol-24-oic acid.

EXAMPLE 4

Methyl 3α,7α-diacetoxy-5β-chol-11-en-3α,7α-diol-24-oic acid

The procedure of Example 3 is followed except that an equivalent amount of methyl chlorosulfite is substituted for methanesulfonyl chloride, to yield the methyl 3α,7α-diacetoxy-5β-chol-11-en-3α,7α-diol-24-oic acid.

EXAMPLE 5

Methyl 3α,7α-diacetoxy-5β-chol-11-en-3α,7α-diol-24-oic acid

To a solution of methyl 3α,7α-diacetoxy-5β-cholan-3α,7α,12α-triol-24-oic acid in pyridine was added thionyl chloride and the mixture held at room temperature overnight. The reaction mixture was then poured into iced water and the resultant precipitate collected, washed and dried. The resultant material was then recrystallized from methanol to yield methyl 3α,7α-diacetoxy-5β-chol-11-en-3α,7α-diol-24-oic acid.

EXAMPLE 6

Methyl 3α,7α-diacetoxy-5β-cholan-3α,7α-diol-24-oic acid

Methyl 3α,7α-diacetoxy-5β-chol-11-en-3α,7α-diol-24-oic acid was subjected to hydrogenation in acetic acid in the presence of palladium on charcoal and the resultant product was recrystallized from methanol to yield methyl-3α,7α-diacetoxy-5β-cholan-3α,7α-diol-24-oic acid.

EXAMPLE 7

3α,7α-dihydroxy-5β-cholanic acid

Methyl 3α,7α,-diacetoxy - 5β - cholan-3α,7α-diol-24-oic acid was refluxed in a 5% alcoholic solution of potassium hydroxide for four hours. Upon recrystallization of the resultant product from ethyl acetate there was obtained 3α,7α-dihydroxy-5β-cholanic acid.

The invention may be variously otherwise embodied within the scope of the appended claims.

I claim:

1. A compound of the formula:

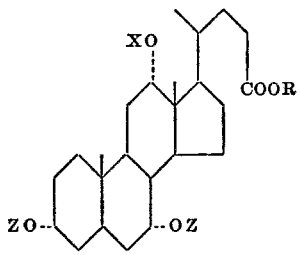

wherein R is hydrogen or lower alkyl; each Z is hydrogen or acyl; and X is CH₃SCH₂.

2. The compound of Claim 1, wherein R is methyl, and each Z is acetyl and X is CH₃SCH₂.

3. The method of producing a compound of the formula

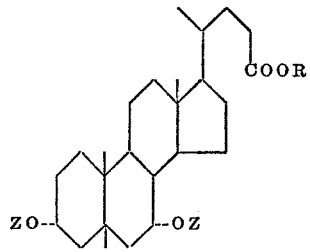

wherein Z and R are as defined in Claim 1, which comprises:

(a) treating a compound of the formula:

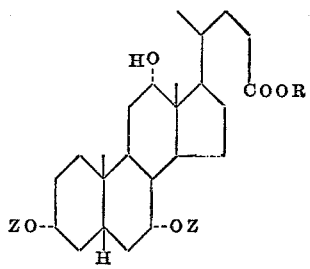

wherein Z and R are as defined in Claim 1, with the sulfonated reagent, dimethyl sulfoxide, in the presence of a base to yield the 12α-sulfonated compound of Claim 1;

(b) dehydrating said 12α-sulfonated compound of step (a) above, by treatment with potassium-t.-butoxide in dimethyl sulfoxide to yield the 11-ene compound of the formula:

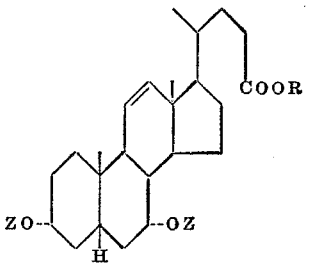

wherein Z and R are as defined in Claim 1; and
(c) hydrogenating said 11-ene compound to yield the desired final product.

References Cited

UNITED STATES PATENTS 3,164,616  1/1965  Bharucha _____ 260—397.1
3,325,483  6/1967  Bharucha et al. ____ 260—239.55

OTHER REFERENCES

Kirk-Steroid Reaction Mechanisms (1968), pp. 81–84.
Dferassi, "Steroid Reactions," p. 239 (1963).

HENRY A. FRENCH, Primary Examiner

U.S. Cl. X.R.

260—999